United States Patent

[11] 3,624,081

[72] Inventors William B. Dickinson
Loudonville;
Philip C. Lang, Schodack, both of N.Y.
[21] Appl. No. 616,191
[22] Filed Feb. 15, 1967
[45] Patented Nov. 30, 1971
[73] Assignee Sterling Drug Inc.
New York, N.Y.

[54] 1-ACYL-2-ETHYLIDENEPYRROL-IDINE-3-CARBOXAMIDES
16 Claims, No Drawings

[52] U.S. Cl..................................... 260/247.2 A,
260/294.7 E, 260/294 A, 260/326.3, 260/561
A, 424/248, 424/262, 424/274
[51] Int. Cl.......................................... C07d 27/14
[50] Field of Search............................. 260/326.3,
247.2 A, 294 A

[56] References Cited
UNITED STATES PATENTS
3,277,114  10/1966  Frenery....................... 260/326.3

OTHER REFERENCES
Wagner et al. Synthetic Organic Chemistry. Wilby, 1953, Sections 348 and 350 are relied on.

Primary Examiner—Nicholas S. Rizzo
Assistant Examiner—Ann Marie T. Tighe
Attorneys—Elmer J. Lawson, B. Woodrow Wyatt, Thomas L. Johnson, Robert K. Bair, R. Clifford Bourgeois and Roge T. Wolfe ABSTRACT: Antibacterial 2-ethyl-1-pyrroline-3-carboxamides and derivatives thereof are prepared from either 1-(2-propynyl)-2-pyrrolidinone or 1-(1,2-propadienyl)-2-pyrrolidinone and amines in the presence of base. The carboxamides react with phenyl isocyanates to produce 1-phenylcarbamyl-2-ethyl-2-pyrroline-3-carboxamides, with either an acid halide or acid anhydride to give the corresponding 1-acyl-2-ethylidenepyrrolidine-3-carboxamides and with hydrogen to give the corresponding 2-ethyl-pyrrolidine-3-carboxamides.

1-ACYL-2-ETHYLIDENEPYRROL-IDINE-3-CARBOXAMIDES

The invention relates to compositions of matter classified in the art of chemistry as 1-pyrrolines, novel compounds derived therefrom, and the processes for obtaining them.

In the first of its aspects, the invention comprises 2-ethyl-3-[(B=N—)carbonyl]-1-pyrrolines having the structural formula

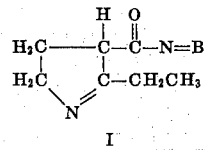

I where —N=B is di-lower-alkylamino, 1-piperidyl, 1-pyrrolidinyl, 4-morpholinyl, (lower-alkyl)-(phenyl)amino or (lower-alkyl)-(phenyl-lower-alkyl)amino.

The 2-ethyl-3-[(B=N—)carbonyl]-1-pyrrolines of formula I are conveniently prepared according to the invention by reacting the known 1-(2-propynyl)-2-pyrrolidinone or the hitherto unknown 1-(1,2-propadienyl)-2-pyrrolidinone with an amine of the formula $$H-N=B$$
II (wherein —N=B has the meaning given above) and an alkali metal alkoxide. The 1-(2-propynyl)-2-pyrrolidinone is convertible by heating, under the strongly basic conditions of the reaction, to the 1-(1,2-propadienyl)-2-pyrrolidinone and so the 1-(1,2-propadienyl)-2-pyrrolidinone and the 1-(2-propynyl)-2-pyrrolidinone are equivalents in the reaction. The reaction is preferably carried out at a temperature between about 100° C. and about 150° C. in an inert atmosphere, for example nitrogen, and in an aprotic solvent inert under the conditions of the reaction, for example, dioxane.

The assigned structure for the 2-ethyl-3-[(B=N—)-carbonyl]-1-pyrrolines of the invention is substantiated by infrared spectral studies. These products show a very young maxima at 6.12–6.15 μ, characteristic for the structure

and the structure

In addition, the nuclear magnetic resonance spectra for these compounds are in complete agreement with the assigned 1-pyrroline structure.

The structure assigned the 2-ethyl-3-[(B=N—)carbonyl]-1-pyrrolines is further substantiated by their behavior on treatment with strong base to give the corresponding acyclic diamide as shown by the equation:

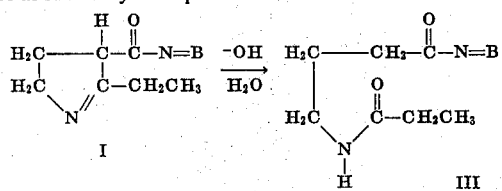

In another of its aspects, the instant invention affords novel 1-phenylcarbamyl-2-ethyl-3-[(B=N—)carbonyl]-2-pyrrolines, having the structural formula

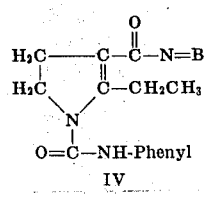

IV in which —N=B has the meaning given above and which are prepared by reacting a compound of formula I with a phenyl isocyanate at a temperature between about 20° and 110° C. in a solvent inert under the conditions of the reaction, for example, dioxane, methylene dichloride or chloroform. A preferred solvent is dioxane. This reaction is shown by the equation:

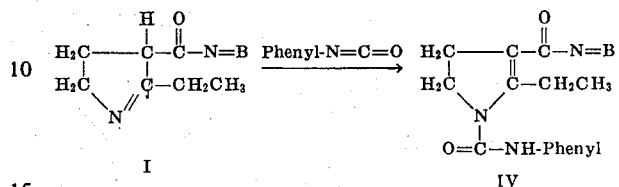

Elemental analysis confirms that the phenyl isocyanate has added to the 2-ethyl-3-[(B=N—)carbonyl]-1-pyrroline which indicates that the double bond of the 1-pyrroline structure migrates as shown in the above equation. Such migration is substantiated by nuclear magnetic resonance spectra which exhibit peaks typical of a normal ethyl group. In addition, ultraviolet spectral examination of the 1-phenylcarbamyl-2-ethyl-3-[(B=N—)-carbonyl]-2-pyrrolines shows extended carbonyl conjugation, as required by the assigned structure.

In still another aspect, the invention provides new 1-R-2-ethylidene-3-[(B=N—)carbonyl]pyrrolidines, having the structural formula

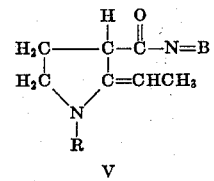

V wherein —N=B has the meaning given above and R is lower-alkanoyl, halo-lower-alkanoyl or benzoyl, and which are prepared by reacting a compound of formula I with either an acid halide of the formula $$R-X$$
VI or acid anhydride of the formula $$(R)_2O$$
VII wherein the Rs have the meaning given above and X is halogen, in the presence of an acid acceptor, for example, triethylamine. The reaction is preferably carried out at a temperature between about 0° and 50° C. in a solvent which is unreactive under the conditions of the reaction, for example, methylene dichloride, carbon tetrachloride or chloroform.

The assigned structure of the 1-R-2-ethylidene-3-[B=N—)carbonyl]pyrrolidines of formula V, was substantiated by both spectral studies and chemical means. Nuclear magnetic resonance spectra established the presence of an ethylidene moiety in these compounds in contrast to an ethyl group present in the 2-ethyl-3-[(B=N—)carbonyl]-1-pyrrolines, the direct precursors. Infrared spectra show strong maxima at 12.08 mμ, typical of the structure

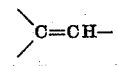

When the 1-R-2-ethylidene-3-[(B=N—)carbonyl]-pyrrolidines (V) of the invention are subjected to hydrolysis using a dilute mineral acid, for example 2N hydrochloric acid, at a temperature between 15° and 50° C., there are obtained the corresponding 1-[(R)amino]-3-[(B=N—)carbonyl]-4-hexanones wherein R has the same meanings hereinbefore given. This is represented schematically by the equation

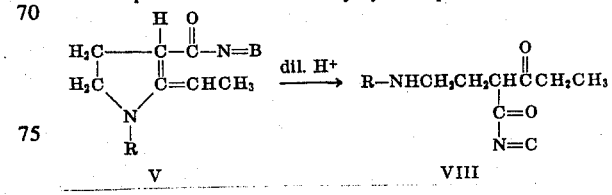

The R in the above formulas when lower-alkanoyl, includes both straight and branched chain radicals having from two to six carbon atoms inclusive as illustrated by, but not limited to, acetyl, propionyl, butyryl, α-methylpropionyl, isobutyryl, hexanoyl, and the like; and when halo-lower-alkanoyl includes straight or branched chain radicals of from two to six carbon atoms inclusive and substituted with at least one halogen atom as illustrated by and without limitation thereto, α-chloropropionyl, β-chlorobutyryl, α,β-dibromopropionyl, trifluoroacetyl, α-bromohexanoyl, and the like.

A still further object of the invention relates to 2-ethyl-3-[(B=N—)carbonyl]pyrrolidines having the structural formula

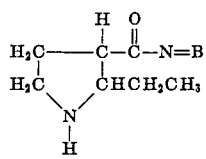

IX wherein —N = B has the meaning given above and which are obtained by catalytic hydrogenation of the corresponding compounds of formula I. The reduction is preferably carried out at a temperature between about 90° and 110° C. at an initial hydrogen pressure of about 2,000 p.s.i. A preferred solvent is ethanol and a preferred catalyst is platinum oxide.

In addition to affording the novel 2-ethyl-3-[(B = N—)-carbonyl]pyrrolidines (IX), the catalytic reduction of the 2-ethyl-3-[(B = N—)carbonyl]-1-pyrrolines (I) is further proof of the chemical structure of the latter.

The pyrrolidines of formula IX react with the appropriate acylating agents to give the corresponding 1-R-2-ethyl-3-[(B=N—)carbonyl]pyrrolidine wherein R has the same meanings given in formula V above.

The acylation is carried out in the conventional way viz, by reacting 2-ethyl-3-[(B=N—)-carbonyl]pyrrolidine of formula IX, with either an acid halide of formula VI or acid anhydride of formula VII in the presence of an acid acceptor, for example, sodium carbonate, potassium carbonate or triethylamine. The reaction is preferably carried out at a temperature between about 0° and 100° C. in a solvent inert under the conditions of the reaction, for example, methylene dichloride, carbon tetrachloride or benzene.

Similarly the reaction of the pyrrolidines of formula IX, with an appropriate phenyl isocyanate gives the corresponding 1-phenylcarbamyl-2-ethyl-3-[(B=N—)carbonyl]pyrrolidine. The reaction is carried out preferably at a temperature between about 0° and 50° C. and in a suitable reaction medium such as a nitrile, for instance, acetonitrile, or a cyclic ether, for instance, dioxane.

In the above general formulas, the radical —N=B includes: di-lower-alklamino; saturated N-heterocyclic groups, such as 1-piperidyl, 1-pyrrolidinyl, 4-morpholinyl, and lower-alkylated derivatives thereof (for example, 2-methyl-1-piperidyl, 3-ethyl-1-pyrrolidyl, 3-methyl-4-morpholinyl, and the like); (lower-alkyl)-(phenyl)amino; or (lower-alkyl)-(phenyl-lower-alkyl)amino. The term lower-alkyl includes alkyl radicals containing from one to six carbon atoms and in the di-lower-alkylamino radicals the lower-alkyl groups can be the same or different. Thus —N=B, when it represents a di-lower-alkylamino radical, includes such groups as dimethylamino, diethylamino, ethylmethylamino, dipropylamino, dibutylamino, dipentylamino, and dihexylamino.

When —N=B represents a (lower-alkyl)-(phenyl)amino group there are included such groups as (methyl)-(phenyl)amino, N(CH₃)(C₆H₅); (ethyl)-(phenyl)amino, N(C₂H₅)(C₆H₅); (isopropyl)-(phenyl)amino, N(C₃H₇)(C₆H₅); (butyl)-(phenyl)amino, N(C₄H₉)(C₆H₅); (hexyl)-(phenyl)amino, N(C₆H₁₃)(C₆H₅); and the like. In the preferred types of (lower-alkyl)-(phenyl)amino groups, the lower-alkyl groups have from one to six carbon atoms. When representing (lower-alkyl)-(phenyl-lower-alkyl)amino, —N=B includes (methyl)-(benzyl)amino, N(CH₃)(C₆H₅CH₂); (ethyl)-(phenethyl)amino, (phenyl)amino, N(C₂H₅)(C₆H₅CH₂CH₂); (propyl)-(benzyl)-amino, N(C₃H₇)(C₆H₅CH₂); (butyl)-(phenethyl)amino, N(C₄H₉)(C₆H₅CH₂CH₂); and the like. In the preferred types of (lower-alkyl)-(phenyl-lower-alkyl)amino groups, the lower-alkyl groups have from one to six carbon atoms and the alkylene radicals of the phenyl-lower-alkyl groups have from one to four carbon atoms.

The benzene ring of phenyl, benzoyl, and phenylcarbamyl can bear any number and kind of substituents such as will occur to those skilled in the art. The presence of such substituents on the benzene ring does not adversely affect the chemotherapeutic or pharmacological activity of the compositions of this invention and such substituted compounds are the full equivalents of the compositions herein claimed. Among such substituted-benzene rings are, without limiting the generality of the foregoing, lower-alkylphenyl, e.g. methylphenyl, ethylphenyl, isopropylphenyl or any other analogous lower-alkylphenyl radical, halophenyl, i.e. chlorophenyl, bromophenyl, fluorophenyl, lower-alkoxyphenyl, e.g. methoxyphenyl, ethoxyphenyl, butoxyphenyl or any other analogous lower-alkoxyphenyl radical, nitrophenyl, trifluoromethylphenyl, lower-alkylmercaptophenyl, e.g. methylmercaptophenyl, butylmercaptophenyl or any other analogous lower-alkylmercaptophenyl radical, or any equivalent substituted phenyl radical.

Pharmacological evaluation of the compounds of the invention has shown that they possess chemotherapeutic and pharmacodynamic properties. In particular, the compounds of formulas I, V and 1-acyl- and 1-phenylcarbamyl-substituted derivatives of compounds of formula IX have been found to have bacteriostatic activity. The compounds of formulas I, IV, V and 1-acyl- and 1-phenylcarbamyl-substituted compounds of formula IX, have psychotropic activity.

The intermediate, 1-(1,2-propadienyl)-2-pyrrolidinone, is prepared by reacting 2-pyrrolidinone, a strong alkali metalating agent, as for example, sodium hydride, and propargyl bromide under an atmosphere of nitrogen and preferably at a temperature between about 25° C. and about 110° C. in a solvent inert under the conditions of the reaction. A preferred solvent is dioxane.

Alternatively, the known 1-(2-propynyl)-2-pyrrolidinone can be isomerized to 1-(1,2-propadienyl)-2-pyrrolidinone under an atmosphere of nitrogen with an alkali metal alkoxide, preferably at a temperature between about 60° and 125° C. in a solvent inert under the conditions of the reaction, for example, methanol, isopropanol, benzene or toluene.

The products of the invention can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solution or oil-water emulsions in the same manner as conventional medicinal substances are prepared.

The chemical structures of the compounds of the invention are corroborated by the correspondence between calculated values for the elements and values found by chemical analysis. Further corroboration follows from concordant spectral data and from degradation studies as stated hereinbefore.

The following procedures and examples will enable those skilled in the art to better understand the nature of the invention, but are given solely to illustrate specific embodiments of the invention without the latter being limited thereto.

1-(1,2-PROPADIENYL-2-PYRROLIDINONE

Method A: A solution containing 85 g. (1.0 mole) of 2-pyrrolidinone in 250 ml. of dioxane was added slowly over a 1 hour period to a 2 l. flask containing a stirred suspension of 48 g. (1.0 mole) of sodium hydride (50-percent dispersion in mineral oil) in 700 ml. dioxane under a nitrogen atmosphere. The mixture was refluxed for 1½ hours and then cooled to room temperature. A solution containing 120 g. (1.0 mole) of propargyl bromide in 50 ml. dioxane was added dropwise during 1 hour to the stirred mixture. The mixture was next warmed at 80° C., for 1 hour and then stirred at ambient temperature overnight. The insoluble portion was removed by vacuum filtration through diatomaceous earth and the filtrate concentrated in vacuo. The upper layer of mineral oil was drawn off in a separatory funnel and the residue distilled to give 1-(1,2-propadienyl)-2-pyrrolidine, a pale yellow oil: b.p. 74°–76 C. (0.08 mm.), $n_D^{25}$ 1.5401.

Anal.
Calcd. for $C_7H_9No$:   Found:   C, 68.24; H, 7.36

Significant infrared maxima were found at 5.10 μ (s) and 5.93 μ (s). The nuclear magnetic resonance spectrum was in complete agreement with the structure assigned.

Method B: A solution containing 36.9 (0.3 mole) 1-(2-propynyl)-2-pyrrolidinone, 5 g. sodium methoxide and 300 ml. methanol was placed in a 500 ml. flask and refluxed for 3 hours under an atmosphere of nitrogen. The solvent was removed in vacuo, ethyl ether added and the sodium methoxide filtered off. The filtrate was concentrated in vacuo and the resulting oil distilled to give 1-(1,2-propadienyl)-2-pyrrolidinone, a pale yellow oil, b.p. 74°–76° C. (0.08 mm.), $n_D^{25}$ 1.5401, having infrared and nuclear magnetic resonance spectra identical to those obtained on the product resulting from Method A.

2-ETHYL-3-[(B=N—)CARBONYL]N-)CARBONYL]-1-pyrrolines (I)

Example I

A mixture of 61.5 g. (0.5 mole) of 1-(2-propynyl)-2-pyrrolidinone, 33.5 g. (0.5 mole) of pyrrolidine, 21.6 g. (0.4 mole) of sodium methoxide and 200 ml. of dioxane, in a 500 ml. flask, was stirred and refluxed under a nitrogen atmosphere 2 hours. The insoluble portion was removed by vacuum filtration through diatomaceous earth and the filtrate concentrated in vacuo. Column chromatography (1,500 g. silica gel) was employed to purify the residual oil. Distillation in vacuo gave 2-ethyl-3-[(1-pyrrolidinyl)carbonyl]-1-pyrroline, a pale yellow oil, b.p. 115° C. (0.05 mm.), $n_D^{25}$ 1.5120.

Anal.
Calcd. for $C_{11}H_{18}N_2O$:   C, 68.00; H, 9.34; N, 14.42
Found:   C, 67.98; H, 9.08; N, 14.33

Infrared maxima appeared at 6.14 μ (vs) broad. The assigned structure is completely corroborated by a concordant nuclear magnetic resonance spectrum.

Example 1a

A mixture of 80.9 g. (0.66 mole) of 1-(1,2-propadienyl)-2-pyrrolidinone, 49.7 g. (0.7 mole) of pyrrolidine, 15.2 g. (0.3 mole) of sodium methoxide and 600 ml. of dioxane, in a 1-liter flask, was stirred and refluxed under a nitrogen atmosphere during 3 hours. The insoluble portion was removed by vacuum filtration through diatomaceous earth and the filtrate concentrated in vacuo. Column chromatography (magnesium silicate) was employed to purify the residual oil. Vacuum distillation gave 2-ethyl-3-[(1-pyrrolidinyl)carbonyl]-1-pyrroline, a pale yellow oil, b.p. 118° C. (0.055 mm.), $n_D^{25}$ 1.5112. Infrared and nuclear magnetic resonance spectra were identical with those obtained on the product in example 1.

ALKALINE HYDROLYSIS OF 2-ETHYL-3-[(1-PYRROLIDINYL)CARBONYL]-1-PYRROLINE

A solution of 7.76 g. (0.04 mole) of 2-ethyl-3-[(1-pyrrolidinyl)carbonyl]-1-pyrroline and 30 ml. 15 percent sodium hydroxide, in a 50 ml. flask, was refluxed for 2 hours and then cooled. Upon standing an oil separated from the aqueous layer. The oil was drawn off, washed with water, dissolved in methylene chloride, the solution dried, and concentrated to give an oil. Vacuum distillation gave an oil, b.p. 145°–146° C. (0.07 mm.), which crystallized upon standing. Recrystallization from tetrahydrofuran/ethyl ether gave a white solid, m.p. 61°–62 C., which showed no melting point depression when mixed with authentic 1-[3-(propionamido)butyryl]pyrrolidine and had an infrared spectrum identical to that of an authentic sample of 1-[3-(propionamido)butyryl]pyrrolidine as well as a completely concordant nuclear magnetic resonance spectrum.

Anal.
Calcd. for $C_{11}H_{20}N_2O_2$:   C, 62.23; H, 9.50; N, 13.20.
Found:   C, 62.33; H, 9.71; N, 13.24.

Example 2

A mixture of 24.6 g. (0.2 mole) of 1-(2-propynyl)-2-pyrrolidinone, 19.0 g. (0.2 mole) of piperidine, 10.8 g. (0.2 mole) of sodium methoxide and 150 ml. dioxane, in a 250 ml. flask, was stirred and refluxed under a nitrogen atmosphere for a period of 3 hours. The insoluble portion was removed by vacuum filtration through diatomaceous earth and the filtrate concentrated in vacuo. Column chromatography (1,000 g. silica gel) was employed to purify the residual oil. Distillation gave 2-ethyl-3-[(1-piperidyl)carbonyl]-1-pyrroline, a pale yellow oil, b.p. 120° C. (0.05 mm.), $n_D^{25}$ 1.5110.

Anal.
Calcd. for $C_{12}H_{20}N_2O$:   C, 69.19; H, 9.68; N, 13.45
Found:   C, 68.90; H, 9.78; N, 13.14

Significant infrared maxima appeared at 6.15 μ (vs). The nuclear magnetic resonance spectrum was in complete agreement with assigned structure.

Example 3

A mixture of 24.6 g. (0.2 mole) of 1-(2-propynyl)-2-pyrrolidinone, 17.4 g. (0.2 mole) of morpholine, 10.8 g. (0.2 mole) of sodium methoxide and 150 ml. dioxane in a 250 ml. flask was stirred and refluxed under a nitrogen atmosphere for a period of 3 hours. The insoluble portion was removed by vacuum filtration through diatomaceous earth and the filtrate concentrated in vacuo. The residue was dissolved in dilute hydrochloric acid and washed with methylene chloride. The acidic layer was made basic (pH 8–9) with dilute sodium hydroxide, the product extracted with methylene chloride, dried and the solvent removed to give 2-ethyl-3-[(4-morpholinyl)-carbonyl]-1-pyrroline, a yellow oil. Vacuum distillation gave a pale yellow oil: b.p. 136° C. (0.1 mm.). $n_D^{25}$ 1.5190.

Anal.
Calcd. for $C_{11}H_{18}N_2O_2$:   C, 62.83; H, 8.63 N, 13.32
Found:   C, 62.97; H, 8.79; N, 13.35

Infrared spectral analysis showed 5.97 μ (shld) and 6.14 μ (vs) and the nuclear magnetic resonance spectrum was in accord with the assigned structure.

Example 4

A mixture of 61.5 g. (0.5 mole) of 1-(2-propynyl)-2-pyrrolidinone, 27 g. (0.6 mole) of dimethylamine, 27 g. (0.5 mole) of sodium methoxide and 900 ml. dioxane in an 1,800 ml. capacity autoclave liner was rocked at 100°–125° C. for 3 hours and then allowed to cool overnight. The insoluble portion was removed by vacuum filtration through diatomaceous earth and the filtrate concentrated in vacuo. Column chromatography (1,500 g. silica gel) was employed to purify the residual oil. Vacuum distillation gave 2-ethyl-3-(N,N-dimethylcarbamyl)-1-pyrroline, a clear oil, b.p. 80° C. (0.05 mm.), $n_D^{25}$ 1.4922.

Anal.

Calcd. for C₉H₁₆N₂O:  C, 64.25; H, 9.59; N, 16.65
Found:  C, 64.01; H, 9.40; N, 16.59

The nuclear magnetic resonance spectrum was concordant with the assigned structure and a significant infrared maximum appeared at 6.12 μ (vs).

Example 5

Following the procedure of example 1 hereinabove, in the reaction of 6.2 g. (0.05 mole) of 1-(2-propynyl)-2-pyrrolidinone, 5.4 g. (0.05 mole) of N-methyl aniline, 2.2 g. (0.04 mole) of sodium methoxide and 30 ml. of dioxane, there is obtained 2-ethyl-3-[(N-methyl-N-phenylcarbamyl)]-1-pyrroline.

Example 6

Reacting 16.2 g. (0.13 mole) of 1-(1,2-propadienyl)-2-pyrrolidinone, 15.7 g. (0.13 mole) of N-methylbenzylamine, 5.0 g. (0.1 mole) of sodium methoxide and 120 ml. of dioxane, according to the procedure of example 1a, gives 2-ethyl3-(N-methyl-N-benzylcarbamyl)]-1-pyrroline.

When the appropriate amine is used in reaction with 1-(2-propynyl)-2-pyrrolidinone according to example 1 or in reaction with 1-(1,2-propadienyl)-2-pyrrolidinone following the procedure of example 1a, the following 2-ethyl-3-[(B=N—)carbonyl]-1-pyrrolines are obtained:

2-Ethyl-3-[(2-methyl-1-piperidyl)carbonyl]-1-pyrroline from 2-methylpiperidine;
2-Ethyl-3-[(3-ethyl-1-pyrrolidinyl)carbonyl]-1-pyrroline from 3-ethylpyrrolidine;
2-Ethyl-3-[(3-methyl-4-morpholinyl)carbonyl]-1-pyrroline from 3-methylmorpholine;
2-Ethyl-3-[N-ethyl-N-(4-chlorophenyl)carbamyl]-1-pyrroline from N-ethyl-4-chloroaniline;
2-Ethyl-3-[N-ethyl-N-(4-tolyl)carbamyl)]-1-pyrroline from N-ethyl-4-toluidine;
2-Ethyl-3-(N-isopropyl-N-phenylcarbamyl)-1-pyrroline from N-isopropylaniline;
2-Ethyl-3-(N-n-hexyl-N-phenylcarbamyl)-1-pyrroline from N-hexylaniline;
2-Ethyl-3-[(N-methyl-N-(2-nitrophenyl)carbamyl]-1-pyrroline from N-methyl-2-nitroaniline;
2-Ethyl-3-[N-ethyl-N-(phenethyl)carbamyl]-1-pyrroline from N-ethylphenethylamine;
2-Ethyl-3-[N-butyl-N-(4-methoxyphenethyl)carbamyl]-1-pyrroline from N-butyl-4-methoxyphenethylamine;
2-Ethyl-3-[N-propyl-N-(4-phenylbutyl)carbamyl]-1-pyrroline from N-propyl-4-phenylbutylamine
1-Phenylcarbamyl-2-ethyl-3-[(B=N—)carbonyl-2-pyrrolines (IV)

Example 7

A solution of 9.7 g. (0.05 mole) of 2-ethyl-3-[(1-pyrrolidinyl)carbonyl]-1-pyrroline, 5.95 g. (0.05 mole) of phenyl isocyanate and 100 ml. dioxane, in a 250 ml. flask, was refluxed for 3 hours and then allowed to stand overnight. The solvent was removed in vacuo, the oil dissolved in ethyl ether and the solution cooled to give 1-phenylcarbamyl-2-ethyl-3-[(1-pyrrolidinyl)carbonyl]-2-pyrroline. Recrystallization twice from tetrahydrofuran gave a white solid, m.p. 174.6°–177° C.

Anal.
Calcd. for C₁₈H₂₃N₃O₂:  C, 68.98; H, 7.40; N, 13.41
Found:  C, 68.61; H, 7.46; N, 13.47

The nuclear magnetic resonance spectrum was concordant with the assigned structure and infrared maxima appeared at 3.09 μ (m), 6.49 μ (s), 5.98 μ (s), 6.27 μ (s) and 6.67 μ (ms). An ultraviolet maximum of 274 mμ at ε 20,400 was observed.

Example 8

A solution of 8.3 g. (0.04 mole) of 2-ethyl-3-[(1-piperidyl)carbonyl]-1-pyrroline, 4.76 g. (0.04 mole) of phenyl isocyanate and 30 ml. methylene chloride in a 50 ml. flask was stirred for 5 hours. The solvent was removed in vacuo, the oil dissolved in ethyl ether and the solution cooled to give 1-phenylcarbamyl-2-ethyl-3-[(1-piperidyl)carbonyl]-2-pyrroline. Recrystallization twice from ethyl ether gave a white solid: m.p. 151°–152° C.

Anal.
Calcd. for C₁₉H₂₅N₃O₂:  C, 69.70; H, 7.70; N, 12.84
Found:  C, 69.92; H, 7.58; N, 12.68

Infrared maxima appeared at 3.08 μ (m), 6.51 μ (s), 5.98 μ (s), 6.27 μ (s) and 6.67 μ (s). An ultraviolet maximum appeared at 269 mμ at ε 22,000. The nuclear magnetic resonance spectrum was in complete agreement with the assigned structure.

Example 9

A solution of 1.9 g. (0.009 mole) of 2-ethyl-3-[(4-morpholinyl)carbonyl]-1-pyrroline, 1.2 g. (0.01 mole) of phenyl isocyanate and 20 ml. dioxane in a 50 ml. flask was stirred for 2 hours. The solvent was removed in vacuo, the oil dissolved in ethyl ether and the solution cooled to give a solid, which upon recrystallization twice from tetrahydrofuran gave 1-phenylcarbamyl-2-ethyl-3-[(4-morpholinyl)carbonyl]-2-pyrroline, a white solid; m.p. 174°–175° C.

Anal.
Calcd. for C₁₈H₂₃N₃O₃:  C, 65.63; H, 7.04; N, 12.55
Found:  C, 65.84; H, 7.20; N, 12.55

A nuclear magnetic resonance spectrum completely concordant with the assigned structure was obtained and infrared maxima appeared at 3.10 μ (m), 6.49 μ (s), 5.99 μ (s), 6.26 μ (s) and 6.66 μ (s). Ultraviolet showed a maximum at 272 mμ at ε 21,200.

Example 10

A solution of 3.4 g. of 2-ethyl-3-(N,N-dimethylcarbamyl)-1-pyrroline (0.02 mole), 2.4 g. (0.02 mole) of phenyl isocyanate and 20 ml. dioxane, in a 50 ml. flask, was stirred for 4 hours. The solvent was removed in vacuo, the oil dissolved in ethyl ether and the solution cooled to give 1-phenylcarbamyl-2-ethyl-3-(N,N-dimethylcarbamyl)-2-pyrroline which upon recrystallization twice from tetrahydrofuran gave a white solid: m.p. 147°–148° C.

Anal.
Calcd. for C₁₆H₂₁N₃O₂:  C, 66.87; H, 7.37; N, 14.62
Found:  C, 66.75; H, 7.67; N, 14.71.

Significant infrared maxima appeared at 3.12 μ (m), 6.50 μ (s), 5.98 μ (s), 6.24 μ (m), 6.28 μ (s) and 6.66 μ (s). A maximum of 270 mμ at ε 21,600 was observed in the ultraviolet. The nuclear magnetic resonance spectrum is in complete agreement with assigned structure.

When 2-ethyl-3-[(B=N—)carbonyl]-1-pyrroline is reacted with the appropriate isocyanate, according to the procedure of example 7, 8, 9 or 10, there is obtained:

1-(4-Tohyl)carbamyl-2-ethyl-3-[(2-methyl-1-piperidyl)-carbonyl]-2-pyrroline;
1-(4-Nitrophenyl)carbamyl-2-ethyl-3-[-ethyl-1-pyrrolidinyl)carbonyl]-2-pyrroline;
1-(2,5-Dichlorophenyl)carbamyl-2-ethyl-3-[N-ethyl-N-(4-chlorophenyl)carbamyl]-2-pyrroline;
1-(2-Ethoxyphenyl)carbamyl-2-ethyl-3-(N-methyl-N-benzylcarbamyl)-2-pyrroline;
1-(4-Chlorophenyl)carbamyl-2-ethyl-3-(N-methyl-N-phenylcarbamyl)-2-pyrroline;
1-(2-Methoxyphenyl)carbamyl-2-ethyl-3-[N-ethyl-N-(4-tolyl)carbamyl]-2-pyrroline;
1-(4-Bromophenyl)carbamyl-2-ethyl-3-(N-isopropyl-N-phenylcarbamyl)-2-pyrroline;

1-(2-Nitrophenyl)carbamyl-2-ethyl-3-[N-methyl-N-(2-nitrophenyl)carbamyl]-2-pyrroline;
1-(2-Tolyl)carbamyl-2-ethyl-3-[N-ethyl-N-(phenethyl)-carbamyl]-2-pyrroline.

1-R-2 Ethylidene-3-[(B=N−) carbonyl] pyrrolidines (V)

Example 11

A solution of 4.8 g. (0.04 mole) of pivaloyl chloride in 10 ml. methylene chloride was added over 10 minutes to a 100 ml. flask containing 7.8 g. (0.04 mole) of 2-ethyl-3-[(1-pyrrolidinyl)carbonyl]-1-pyrroline, 8 ml. of triethylamine and 50 ml. methylene chloride. The solution was stirred for 3 hours, then washed with cold water, dried, and the solvent removed. Column chromatography (250 g. silica gel) was used to purify the residual oil. The product was eluted to give a solid. Recrystallization twice from ethyl ether gave 1-pivaloyl-2-ethylidene-3-[(1-pyrrolidinyl)carbonyl]pyrrolidine, white needles, m.p. 90°–91° C.

Anal.
Calcd. for $C_{16}H_{26}N_2O_2$:    C, 69.02; H, 9.41; N, 10.06
Found:    C, 69.16; H, 9.45; N, 10.04.

Infrared maxima appeared at 6.00 μ (s), 6.14 μ (s), and 12.02 μ (s). The nuclear magnetic resonance spectrum was in complete agreement with the assigned structure.

Example 12

A solution of 3.8 g. (0.05 mole) of acetyl chloride in 20 ml. methylene chloride was a added dropwise during 20 minutes to a 100 ml. flask containing 9.7 g. (0.05 mole) of 2-ethyl-3-[(1-pyrrolidinyl)carbonyl]-1-pyrroline, 12 ml. of triethylamine and 40 ml. methylene chloride. The mixture was stirred for 3 hours, washed twice with cold water, dried, and the solvent removed. The residue was dissolved in methylene chloride/ethyl ether and cooled to give 1-acetyl-2-ethylidene-3-[(1-pyrrolidinyl)carbonyl]-pyrrolidine as a solid. Recrystallization twice from methylene chloride/ethyl ether gave a white solid, m.p. 105°–106° C.

Anal.
Calcd. for $C_{13}H_{20}N_2O_2$:    C, 66.07; H, 8.53; N, 11.86
Found:    C, 66.24; H, 8.54; N, 11.74.

Infrared maxima appeared at 6.00 μ (vs), 6.15 μ (vs), and 12.08 μ (s). The nuclear magnetic resonance spectrum was in agreement with the assigned structure directly after purification. One week later, examination by nuclear magnetic resonance spectra showed that the product had undergone isomerization to 1-acetyl-2-ethyl-2-[(1-pyrrolidinyl)carbonyl]-2-pyrroline.

Example 13

A solution of 16.1 g. (0.07 mole) of 3,5-dinitrobenzoyl chloride in 40 ml. chloroform was added slowly over a 10-minute period to a 200 ml. flask containing 13.6 g. (0.07 mole) of 2-ethyl-3-[(1-pyrrolidinyl)carbonyl]-1-pyrroline, 12 g. of triethylamine and 60 ml. chloroform. The solution was stirred at ambient temperature for 3 hours, then washed with water, dried and the solvent removed. The brown semisolid residue was rubbed under ethyl ether to give 1-(3,5-dinitrobenzoyl)-2-ethylidene-3-[(1-pyrrolidinyl)carbonyl]pyrrolidine. Recrystallization twice from tetrahydrofuran, gave an orage solid: m.p. 153°–154° C.

Anal.
Calcd. for $C_{18}H_{20}N_4O_6$:    C, 55.66; H, 5.19; N, 14.43
Found:    C, 55.70; H, 5.28; N, 14.47.

Significant infrared maxima were observed at 6.17 μ (s), 6.48 μ (s), 7.44 μ (s) and 12.20 μ (s). The nuclear magnetic resonance spectrum was concordant with the assigned structure.

Example 14

A solution of 9.84 g. (0.07 mole) of benzoyl chloride in 40 ml. methylene chloride was added over 10 minutes to a 250 ml. flask containing 13.6 g. (0.07 mole) of 2-ethyl-3-[(1-pyrrolidinyl)carbonyl]-1-pyrroline, 10.1 g. (0.1 mole) of triethylamine and 60 ml. methylene chloride. The solution was stirred for 3 hours, then washed with cold water, dried, and the solvent removed in vacuo. The residual oil was dissolved in ethyl ether and the solution cooled to give 1-benzoyl-2-ethylidene-3-[(1-pyrrolidinyl)carbonyl]pyrrolidine. Recrystallization from tetrahydrofuran/ethyl ether and then from tetrahydrofuran gave a white solid: m.p. 118°–120° C.

Anal.
Calcd. for $C_{18}H_{22}N_2O_2$:    C, 72.45; H, 7.43; N, 9.39
Found:    C, 72.46; H, 7.42; N, 9.49.

Analysis by infrared spectrum showed maxima at 6.00 μ (vs), 6.15 μ (vs) and 12.08 μ (s). The nuclear magnetic resonance spectrum was in agreement with the assigned structure directly after purification. After 2 weeks, the nuclear magnetic resonance spectrum of the compound showed that the product has isomerized to 1-benzoyl-2-ethyl-3-[(1-pyrrolidinyl)carbonyl]-2-pyrroline.

Example 15

Following the procedure of example 13 as described hereinabove, the reaction of 5.04 g. (0.03 mole) of 2-ethyl-3-(N,N-dimethylcarbamyl)-1-pyrroline with 7.0 g. (0.031 mole) of 3,5-dinitrobenzoyl chloride in the presence of 10 ml. of triethylamine and in 50 ml. of chloroform gave 1-(3,5-dinitrobenzoyl)-2-ethylidine-3-(N,N-dimethylcarbamyl)-pyrrolinine. Recrystallization twice from tetrahydrofuran gave the product as a yellow solid, m.p. 166°–167° C.

Anal.
Calcd. for $C_{16}H_{18}N_4O_6$:    C, 53.03; H, 5.01; N, 15.46
Found:    C, 53.06; H, 5.02; N, 15.06

The infrared and nuclear magnetic resonance spectra were in complete agreement with the assigned structure.

Example 16

A solution of 15.8 g. (0.08 mole) of trifluoroacetic anhydride in 20 ml. of methylene chloride was added slowly over a 20-minute period to a 250 ml. flask containing 15.5 g. (0.08 mole) of 2-ethyl-3-[(1-pyrrolidinyl)carbonyl]-1-pyrroline, 10.1 g. (0.1 mole) of triethylamine and 80 ml. methylene chloride, chilled in an ice bath. After the addition the ice bath was removed and the solution was stirred it ambient temperature for 3 hours, then washed with cold water, dried, and the solvent removed to give a residual oil. column chromatography (500 g. silica gel) was employed to purify the oil to give a solid. Recrystallization twice from ethyl ether gave 1-trifluoroacetyl-2-ethylidene-3-[(1-pyrrolidinyl)carbonyl]-pyrrolidine, a white solid: m.p. 91.5°–92.0° C.

Anal.
Calcd. for $C_{13}H_{17}F_3N_2O_2$:    C, 53.78; H, 5.90 F, 19.64
Found:    C, 54.15; H, 6.09 F, 19.37.

Upon infrared spectral analysis maxima appeared at 5.95 μ (s), 6.12 μ (s) and 12.08 μ (m). Nuclear magnetic resonance spectrum was concordant with the assigned structure.

Example 17

Employing the procedure of example 16, 10.5 g. (0.05 mole) of trifluoroacetic anhydride was caused to react with 8.4 g. (0.05 mole) of 2-ethyl-3-(N,N-dimethylcarbamyl)-1-pyrroline in the presence of 8.0 g. (0.08 mole) of triethylamine and in 80 ml. methylene chloride to obtain 1-trifluoroacetyl-2-ethylidene-3-(N,N-dimethylcarbamyl) pyrrolidine which upon recrystallization twice from ethyl ether was a white solid: m.p. 74°–75° C.

Anal.
Calcd. for $C_{11}H_{15}F_3N_2O_2$:    C, 49.99; H, 5.72; F, 21.57
Found:    C, 49.90; H, 5.55; F, 20.98.

Significant infrared maxima were found at 5.19 μ (s) 6.10 μ (s), and 12.00 μ (s). Nuclear magnetic resonance spectrum was in agreement with the assigned structure.

Example 18

When the procedure of example 16 above is followed in the reaction of 6.3 g. (0.03) of trifluoroacetic anhydride with 6.2 g. (0.03 mole) of 2-ethyl-3-[(1-piperidyl)carbonyl]-1-pyrroline in the presence of 8 ml. of triethylamine and in 20 ml. methylene chloride there is obtained 1-trifluoroacetyl-2-ethylidene-3-[(1-piperidyl)carbonyl]-pyrrolidine as white needles: m.p. 99°–100° C.

Anal.
Calcd. for $C_{14}H_{19}F_3N_2O_2$:    C, 55.25; H, 6.29; N, 9.20; F, 18.73
Found:    C, 55.03; H, 6.27; N, 9.18; F, 18.48.

Significant infrared maxima were found at 5.93 μ (s), 6.14 μ (s), and 12.08 μ (s). The nuclear magnetic resonance spectrum was in agreement with the assigned structure.

Employing the procedure either of example 11 or example 16 hereinabove in reacting an appropriate acid chloride or acid anhydride respectively, with the proper 2-ethyl-3-[(B=N—)carbonyl]-1-pyrroline of formula I there is obtained:

1-(4-Methoxybenzoyl)-2-ethylidene-3-(N,N-dimethyl-carbamyl)pyrrolidine;
1-Pivatoyl-2-ethylidene-3-(N-methyl-N-phenyl-carbamyl)pyrrolidine;
1-Butyryl-2-ethylidene-3-(N-methyl-N-benzyl-carbamyl)pyrrolidine;
1-Pentafluoropropionyl-2-ethylidene-3-[(2-methyl-1-piperidyl)carbonyl]pyrrolidine;
1-(6-Bromohexanoyl)-2-ethylidene-3-[(1-pyrrolidinyl) carbonyl]pyrrolidine;
1-Benzoyl-2-ethylidene-3-[N-ethyl-N-(4-chlorophenyl)carbamyl]pyrrolidine;
1-(4-Toluoyl)-2-ethylidene-3-[N-ethyl-N-(4-tolyl)-carbamyl]pyrrolidine;
1-(3-Bromobenzoyl)-2-ethylidene-3-(N-isopropyl-N-phenylcarbamyl)pyrrolidine;
1-(3,4-Dichlorobenzoyl)-2-ethylidene-3-[N-n-butyl-N-(4-methoxyphenyl)carbamyl]pyrrolidine;
1-(3-Chlorobutyryl)-2-ethylidene-3-[(4-morpholinyl)-carbonyl]pyrrolidine.

1-[(R)AMINO]-3-[(B=N—)CARBONYL]-4-HEXANONES. (VIII)

Example 19

A solution of 3.0 g. (0.01 mole) of 1-benzoyl-2-ethylidene-3-[(1-pyrrolidinyl)carbonyl]-pyrrolidine and 60 ml. of 2N hydrochloric acid in a 100 ml. flask was stirred for 3 hours and then extracted with methylene chloride. The organic phase was dried, and the solvent removed to give 1-benzamido-3-[(1-pyrrolidinyl)carbonyl]-4-hexanone as a white solid, m.p. 82°–83 C., after recrystallization twice from tetrahydrofuran ethyl ether.

Anal.
Calcd. for $C_{19}H_{24}N_2O_3$:    C, 68.33; H, 7.65; N, 8.85
Found:    C, 68.23; H, 7.76; N, 8.79.

The nuclear magnetic resonance spectrum confirmed the assigned structure. Infrared maxima appeared at 3.01 μ (m), 6.49 μ (s), 5.82 μ (s), 6.08 μ (shld), and 6.5 μ (s).

Example 20

A solution of 3.89 g. (0.01 mole) of 1-(3,5-dinitrobenzoyl)-2-ethylidene-3-[(1-pyrrolidinyl)carbonyl]-pyrrolidine and 30 ml. methylene dichloride, in a 100 ml. flask, was stirred with 20 ml. 1N hydrochloric acid for 5 hours. The methylene dichloride layer was separated, dried and the solvent removed, to give 1-(3,5-dinitrobenzamido)-3-[(1-pyrrolidinyl)-carbonyl]-4-hexanone as a white solid, after recrystallization twice from tetrahydrofuran; m.p. 98°–99° C.

Anal.
Calcd. for $C_{19}H_{22}N_4O_7$:    C, 53.20; H, 5.46; N, 13.79
Found:    C, 53.20; H, 5.43; N, 13.66.

Infrared maxima were found at 3.08 μ (ms), 6.49 μ (s), 5.79 μ (s) and 6.01 μ (s) and 6.19 μ (s). The nuclear magnetic resonance spectrum was concordant with the assigned structure.

Applying the acid hydrolysis procedure of examples 19 and 20 to the appropriate 1-R-2-ethylidene-3-[(B=N—)carbonyl]pyrrolidine of formula V, there is obtained:

1-Pivalamido-3-[(1-pyrrolidinyl)carbonyl]-4-hexanone;
1-Acetamido-3-[(1-pyrrolidinyl)carbonyl]-4-hexanone;
1-(3,5-Dinitrobenzamido)-3-(N,N-dimethylcarbamyl)-4-hexanone;
1-Trifluoroacetamido-3-[(1-pyrrolidinyl)carbonyl]-4-hexanone;
1-Trifluoroacetamido-3-(N,N-dimethylcarbamyl)-4-hexanone;
1-Trifluoroacetamido-3-[(1-piperidyl)carbonyl]-4-hexanone;
1-(4-Methoxybenzamido)-3-(N,N-dimethylcarbamyl)-4-hexanone;
1-Pivalamido-3-(N-methyl-N-phenylcarbamyl)-4-hexanone;
1-Butyramido-3-(N-methyl-N-benzylcarbamyl)-4-hexanone;
1-Pentafluoropropionamido-3-[(2-methyl-1-piperidyl)-carbonyl]-4-hexanone;
1-(6-Bromohexanamido)-3-[(1-pyrrolidinyl)carbonyl]-4-hexanone;
1-Benzamido-3-[N-ethyl-N-(4-chlorophenyl)carbamyl]-4-hexanone;
1-(4-Methylbenzamido)-3-[N-ethyl-N-(4-tolyl)carbamyl]-4-hexanone;
1-(3-Bromobenzamido)-3-(N-isopropyl-N-phenylcarbamyl)-4-hexanone;
1-(3,4-Dichlorobenzamido)-3-[N-n-butyl-N-(4-methoxyphenyl)carbamyl]-4-hexanone;
1-(3-Chlorobutyramido)-3-[(4-morpholinyl)carbonyl]-4-hexanone.

2-ETHYL-3-[(B=N—)CARBONYL]PYRROLIDINES (IX)

Example 21

A mixture of 21.3 g. (0.11 mole) of 2-ethyl-3-[(1-pyrrolidinyl)carbonyl]-1-pyrroline, 2.0 Adams catalyst and 600 ml. absolute ethanol in an 800 ml. capacity autoclave liner was rocked at 105° C. for 3 hours at an initial hydrogen pressure of 1,852 p.s.i. The mixture was allowed to cool overnight. The catalyst was removed by filtration and the filtrate concentrated in vacuo. Column chromatography (700 g. silica gel) was employed to purify the oil. Vacuum distillation gave 17.9 g. of 2-ethyl-3-[(1-pyrrolidinyl)carbonyl]-pyrrolidine, a clear oil: b.p. 110° C. (0.3 mm.); $n_D^{25}$ 1.5230.

Anal.
Calcd. for $C_{11}H_{20}N_2O$:    C, 67.30; H, 10.27; N, 14.27
Found:    C, 67.60; H, 10.27; N, 14.34

Significant infrared maxima appeared at 3.02 μ (w), 6.14 μ (s) and 6.95 μ (s). The assigned structure was confirmed by a concordant nuclear magnetic resonance spectrum.

By catalytically hydrogenating the appropriate 2-ethyl-3-[(B=N—)carbonyl]-1-pyrroline, following the procedure of example 21 above, there is prepared:

2-Ethyl-3-[(1-piperidyl)carbonyl]pyrrolidine;
2-Ethyl-3-[(4-morpholinyl)carbonyl]pyrrolidine;
2-Ethyl-3-(N,N-dimethylaminocarbamyl)pyrrolidine;
2-Ethyl-3-(N-methyl-N-phenylcarbamyl)pyrrolidine;
2-Ethyl-3-(N-methyl-N-benzylcarbamyl)pyrrolidine;
2-Ethyl-3-[(2-methyl-1-piperidyl)carbonyl]pyrrolidine;
2-Ethyl-3-[(3-ethyl-1-pyrrolidinyl)carbonyl]pyrrolidine;
2-Ethyl-3-[(3-methyl-4-morpholinyl)carbonyl]pyrrolidine;
2-Ethyl-3-[N-ethyl-N-(4-chlorophenyl)carbamyl]pyrrolidine;
2-Ethyl-3-[N-ethyl-N-(4-tolyl)carbamyl]pyrrolidine;
2-Ethyl-3-(N-isopropyl-N-phenylcarbamyl)pyrrolidine;
2-Ethyl-3-(N-n-hexyl-N-phenylcarbamyl)pyrrolidine;
2-Ethyl-3-[N-methyl-N-(2-amino)carbamyl]pyrrolidine;
2-Ethyl-3-(N-ethyl-N-phenethylcarbamyl)pyrrolidine;
2-Ethyl-3-[N-n-butyl-N-(4-methoxyphenyl)carbamyl]-pyrrolidine;
2-Ethyl-3-[N-n-propyl-N-(4-phenylbutyl)carbamyl]-pyrrolidine.

1-R-2-ETHYL-3-[(B=N—)CARBONYL]PYRROLIDINES

Example 22

A solution of 7.8 g. (0.34 mole) of 3,5-dinitrobenzoyl chloride in 20 ml. methylene chloride was added slowly over a 10-minute period to a 100 ml. flask containing 6.0 g. (0.34 mole) of 2-ethyl-3-[(1-pyrrolidinyl)carbonyl]pyrrolidine, 7 ml. triethylamine and 30 ml. methylene chloride, cooled in a water bath. After the addition, the bath was removed and the solution was stirred at ambient temperature for 2 hours, then washed with cold water, dried and the solvent removed. The tan oil was dissolved in ethyl ether and cooled to give 1-(3,5-dinitro-benzoyl)-2-ethyl-3-[(1-pyrrolidinyl)carbonyl]-pyrrolidine. Recrystallization twice from ethyl acetate gave a cream colored solid: m.p. 161°–162° C.

Anal.
Calcd. for $C_{18}H_{22}N_4O_6$:  C, 55.38; H, 5.68; N, 14.35
Found:  C, 55.29; H, 5.61; N, 14.61.

Infrared maxima appeared at 6.15 $\mu$ (vs) and 7.45 $\mu$ (s).

Example 23

A solution of 4.1 g. (0.04 mole) of acetic anhydride in 30 ml. of methylene chloride was added slowly over a 15-minute period to a 100 ml. flask containing 8.5 g. (0.04 mole) of 2-ethyl-3-[(4-morpholinyl)carbonyl]pyrrolidine, 9 ml. of triethylamine and 30 ml. of methylene chloride, cooled in a water bath. After the addition, the bath was removed and the solution was stirred at ambient temperature for 3 hours, then washed with cold water, dried and the solvent removed to obtain 1-acetyl-2-ethyl-3-[(4-morpholinyl)-carbonyl]pyrrolidine.

Following the procedure of example 22 or example 23 in reacting an appropriate acid chloride or an appropriate acid anhydride respectively with the appropriate 2-ethyl-3-[(B=N—)carbonyl]pyrrolidine of formula IV gives;
1-Trifluoroacetyl-2-ethyl-3-[(1-piperidyl)carbonyl]-pyrrolidine;
1-(4-Methoxybenzoyl)-2-ethyl-3-(N,N-dimethylcarbamyl)-pyrrolidine;
1-Pivaloyl-2-ethyl-3-(N-methyl-N-phenylcarbamyl)-pyrrolidine;
1-Butyryl-2-ethyl-3-(N-methyl-N-benzylcarbamyl)-pyrrolidine;
1-Pentafluoropropionyl-2-ethyl-3-[(2-methyl-1-piperidyl)-carbonyl]pyrrolidine;
1-(3-Chlorobutyryl)-2-ethyl-3-[(4-morpholinyl)carbonyl]-pyrrolidine;
1-(6-Bromohexanoyl)-2-ethyl-3-[(1-pyrrolidinyl)-carbonyl]pyrrolidine;
1-Benzoyl-2-ethyl-3-[N-ethyl-N-(4-chlorophenyl)carbamyl]pyrrolidine;
1-(4-Toluoyl)-2-ethyl-3-[N-ethyl-N-(4-tolyl)-carbamyl]pyrrolidine;
1-(3-Bromobenzoyl)-2-ethyl-3-(N-isopropyl-N-phenyl-carbamyl)pyrrolidine;
1-(3-Chlorosulfonylbenzoyl)-2-ethyl-3-(N-ethyl-N-phenethycarbamyl)pyrrolidine;
1-(3,4-Dichlorobenzoyl)-2-ethyl-3-[N-n-butyl-N-(4-methoxyphenyl)carbamyl]pyrrolidine.

Example 24

A solution of 5.9 g. (0.03 mole) of 2-ethyl-3-[(1-pyrrolidinyl)carbonyl]pyrrolidine, 4.76 g. (0.04 mole) of phenyl isocyanate and 30 ml. dioxane, in a 50 ml. flask, was stirred for 2 hours and then allowed to stand overnight. The solvent was removed in vacuo and the residue recrystallized from tetrahydrofuran to give 1-phenylcarbamyl-2-ethyl-3-[(1-pyrrolidinyl)-carbonyl]pyrrolidine. An additional recrystallization gave a white solid: m.p. 204°–205° C.

Anal.
Calcd. for $C_{18}H_{25}N_3O_2$:  C, 68.54; H, 7.99; N, 13.32
Found:  C, 68.57; H, 7.73; N, 13.39.

When the procedure of example 24 hereinabove is followed in reacting the appropriate phenyl isocyanate with the proper 2-ethyl-3-[(B=N—)carbonyl]pyrrolidine, there is obtained:
1-(4-Tolyl)carbamyl-2-ethyl-3-[(1-piperidyl)-carbonyl]pyrrolidine;
1(4-Nitrophenyl)carbamyl-2-ethyl-3-(N,N-dimethyl-carbamyl)pyrrolidine;
1-(2-Tolyl)carbamy-2-ethyl-3-(N-methyl-N-phenyl-carbamyl)pyrrolidine;
1-(4-Ethoxyphenyl)carbamyl-2-ethyl-3-(N-methyl-N-benzylcarbamyl)pyrrolidine;
1-(4-Bromophenyl)carbamyl-2-ethyl-3-[2-methyl-1-piperidyl)carbonyl]pyrrolidine;
1-(2,5-Dichlorophenyl)carbamyl-2-ethyl-3-[(1-pyrrolidinyl)carbonyl]pyrrolidine;
1-(3-Nitrophenyl)carbamyl-2-ethyl-3-[N-ethyl-N-(4-chlorophenyl)carbamyl]pyrrolidine;
1-(3-Chlorophenyl)carbamyl-2-ethyl-3-[N-ethyl-N-(4-tolyl)carbamyl]pyrrolidine.

We claim:
1. 1-R-2-ethylidene-3-[(B=N—)carbonyl]pyrrolidine, wherein B=N— is di-lower-alkylamino, 1-piperidyl, 1-pyrrolidinyl, 4-morpholinyl, (lower-alkyl)-(phenyl)amino or (lower-alkyl)-(phenyl-lower-alkyl)amino and R is lower-alkanoyl, halo-lower-alkanoyl or benzoyl.
2. 1R-2-ethylidene-3-[(di-lower-alkylamino)carbonyl]-pyrrolidine, according to claim 1, wherein B=N— is di-lower-alkylamino.
3. 1-(Halo-lower-alkanoyl)-2-ethylidene-3-[(di-lower-alkylamino)carbonyl]pyrrolidine, according to claim 2, wherein R is halo-lower-alkanoyl.
4. 1-Trifluoroacetyl-2-ethylidene-3-(N,N-dimethyl-carbamyl)pyrrolidine, according to claim 3, wherein halo-lower-alkanoyl is trifluoroacetyl and di-lower-alkylamino is dimethylamino.
5. 1-Benzoyl-2-ethylidene-3-[(di-lower-alkylamino)-carbonyl]pyrrolidine, according to claim 2, wherein R is benzoyl.
6. 1-R-2-Ethylidene-3-[(1-piperidyl)carbonyl]pyrrolidine, according to claim 1, wherein B=N— is 1-piperidyl.
7. 1-(Halo-lower-alkanoyl)-2-ethylidene-3-[(1-piperidyl)carbonyl]pyrrolidine, according to claim 6, wherein R is halo-lower-alkanoyl.
8. 1Trifluoroacetyl-2-ethylidene-3-[(1-piperidyl)-carbonyl]pyrrolidine, according to claim 7, wherein halo-lower-alkanoyl is trifluoroacetyl.
9. 1-R-2-Ethylidene-3-[(1-pyrrolidinyl)carbonyl]pyrrolidine, according to claim 1, wherein B=N— is di-lower-alkylamino.
10. 1-Lower-alkanoyl-2-ethylidene-3-[(1-pyrrolidinyl)-carbonyl]pyrrolidine, according to claim 9, wherein R is lower-alkanoyl.
11. 1-Acetyl-2-ethylidene-3-[(1pyrrolidinyl)carbonyl]-pyrrolidine, according to claim 10, wherein lower-alkanoyl is acetyl.

12. 1-Pivaloyl-2-ethylidene-3-[(1-pyrrolidinyl)carbonyl]pyrrolidine, according to claim 10, wherein lower-alkanoyl is pivaloyl.

13. 1-(Halo-lower-alkanoyl)-2-ethylidene-3-[(1-pyrrolidinyl)carbonyl]pyrrolidine, according to claim 9, wherein R is halo-lower-alkanoyl.

14. 1-Trifluoroacetyl-2-ethylidene-3-[(1-pyrrolidinyl)-carbonyl]pyrrolidine; according to claim 13, wherein halo-lower-alkanoyl is trifluoroacetyl.

15. 1-Benzoyl-2-ethylidene-3-[(1-pyrrolidinyl)carbonyl]pyrrolidine, according to claim 9, wherein R is benzoyl.

16. The process for preparing 1-R-2-ethylidene-3-[(B=N—)carbonyl]pyrrolidine, according to claim 1, which comprises reacting 2-ethyl-3-[(B=N—)carbonyl]1-pyrroline with a compound of the formula $(R)_2O$ or a compound of the formula

R—X wherein the Rs are lower-alkanoyl, halo-lower-alkanoyl or benzoyl and X is halogen and B=N— has the meanings given in claim 13.

* * * * *